United States Patent [19]

Rotter

[11] Patent Number: 5,177,838
[45] Date of Patent: Jan. 12, 1993

[54] FASTENER FOR MAGNETIC TAPE CARTRIDGE AND METHOD OF USE THEREOF

[75] Inventor: Gerhard Rotter, Mission Viejo, Calif.

[73] Assignee: Athana Incorporated, Torrance, Calif.

[21] Appl. No.: 662,749

[22] Filed: Mar. 1, 1991

[51] Int. Cl.$^5$ ............................................. A44B 17/00
[52] U.S. Cl. ........................................ 24/625; 24/297
[58] Field of Search ................... 24/625, 295, 297; 242/192; 411/508, 913; 403/290

[56] References Cited

U.S. PATENT DOCUMENTS

| | | | |
|---|---|---|---|
| 3,037,596 | 6/1962 | Fordyce | 24/297 |
| 3,692,255 | 9/1972 | Von Behren | 242/192 |
| 4,012,155 | 3/1977 | Morris | 24/625 |
| 4,485,531 | 12/1984 | Murphy | 24/297 |
| 4,571,789 | 2/1986 | Morioka | 24/625 |
| 4,579,473 | 4/1986 | Brugger | 24/297 |
| 4,768,704 | 9/1988 | Beckway et al. | 24/297 |

FOREIGN PATENT DOCUMENTS

| | | | |
|---|---|---|---|
| 1111742 | 3/1956 | France | 24/625 |
| 1379735 | 1/1975 | United Kingdom | 24/625 |

*Primary Examiner*—Victor N. Sakran
*Attorney, Agent, or Firm*—Freilich Hornbaker Rosen

[57] ABSTRACT

In a tape cartridge (20), a snap pin fastener (100) is provided for securing the cover (88) and base plate (90) while permitting therebetween differential expansion in a longitudinal direction (108) of the base plate. One dimension (112) of the snap pin is chosen small enough to flex under a force induced by differential thermal expansion of the cover and base plate. Thus the base plate remains flat, insuring registration between the tape and a transducer head. The second dimension (114) is chosen great enough to provide, with the first dimension, a cross section (115) sufficient to resist operational forces placed on the cover and base.

9 Claims, 3 Drawing Sheets

5,177,838

FASTENER FOR MAGNETIC TAPE CARTRIDGE AND METHOD OF USE THEREOF

FIELD OF THE INVENTION

The present invention pertains to magnetic tape cartridges and, more particularly, to fasteners for securing the cartridge cover and base plate.

BACKGROUND OF THE INVENTION

In a magnetic tape cartridge, for example of the type described in U.S. Pat. No. 4,571,789, in which the tape moves bidirectionally at high speeds between two reels, it is important to avoid physical distortion of the cartridge which can be caused by differential thermal expansion between the plastic cover and aluminum base plate. Otherwise, accurate tracking of the tape by a transducer head inserted into the cartridge is degraded.

Such tape cartridges typically comprise a thin aluminum base plate and a polymeric cover. The tape reels and tape guides are generally mounted on the base plate.

The aforementioned U.S. Pat. No. 4,571,789 describes a snap fastener which connects the cartridge cover and base plate while allowing the cover and plate to expand at different rates without greatly deforming the cartridge. More particularly, the snap fastener is described as including a solid body portion attached to the cover, a bifurcation defined by a slot, and two spring arms extending from the bifurcation toward a hole in the base plate, the spring arms being capable of resilient deflection toward each other.

The arms terminate in enlarged heads for insertion through the base plate hole, which heads have a dimension parallel to the slot equal to or less than the hole, and an undeflected dimension transverse to the slot greater than the hole. The patent describes that insertion of the enlarged heads into the hole causes deflection of the spring arms toward each other allowing passage of the heads through the hole and permitting the resilient return of the spring arms to the undeflected position wherby the snap fastener is retained in the hole.

Since these snap fasteners effect a somewhat flexible connection between the cover and the base plate, they reportedly reduce the deformation or bowing of the cover and the base plate, due to forces induced by differential thermal expansion, as compared to a rigid connection such as a screw fastener. The somewhat flexible connection is attributable to the bifurcation of the snap fastener which allows the fastener to bend. The same fastener bifurcation, however, also has to secure the cover to the base plate. These requirements are somewhat contradictory because for minimum thermal distortion the fastener should be as flexible as possible but for maximum hold down force, it should be as stiff as possible.

SUMMARY OF THE INVENTION

The present invention is directed to an improved fastener for securely fastening a cover to a parallel base plate while allowing the cover and base plate to expand at different rates without bowing.

A fastener in accordance with the invention is constructed to exhibit relative flexibility in a first direction and relative rigidity in a second direction perpendicular to said first direction. In use, the fastener is secured between a cover and base plate with its first direction oriented parallel to the longitudinal dimensions, i.e. primary direction of expansion, of the cover and base plate to accommodate differential expansion. The securement of the fastener to the cover and base plate is primarily oriented along said second direction to produce a strong hold down force.

A preferred fastener in accordance with the invention comprises a pin whose cross sectional dimension is relatively small (thin) in said first direction and relatively large (thick) in said second direction to thus exhibit said relative flexibility and rigidity, respectively.

In a preferred embodiment, the pin is formed with two short legs spaced along said second dimension and capable of limited resilient movement relative to each other for snapping into locking engagement with a hole in the cover and/or base plate.

The novel features of the invention are set forth with particularity in the appended claims. The invention will be best understood from the following description when read in conjunction with the accompanying drawings.

DETAILED DESCRIPTION

Figure 1:
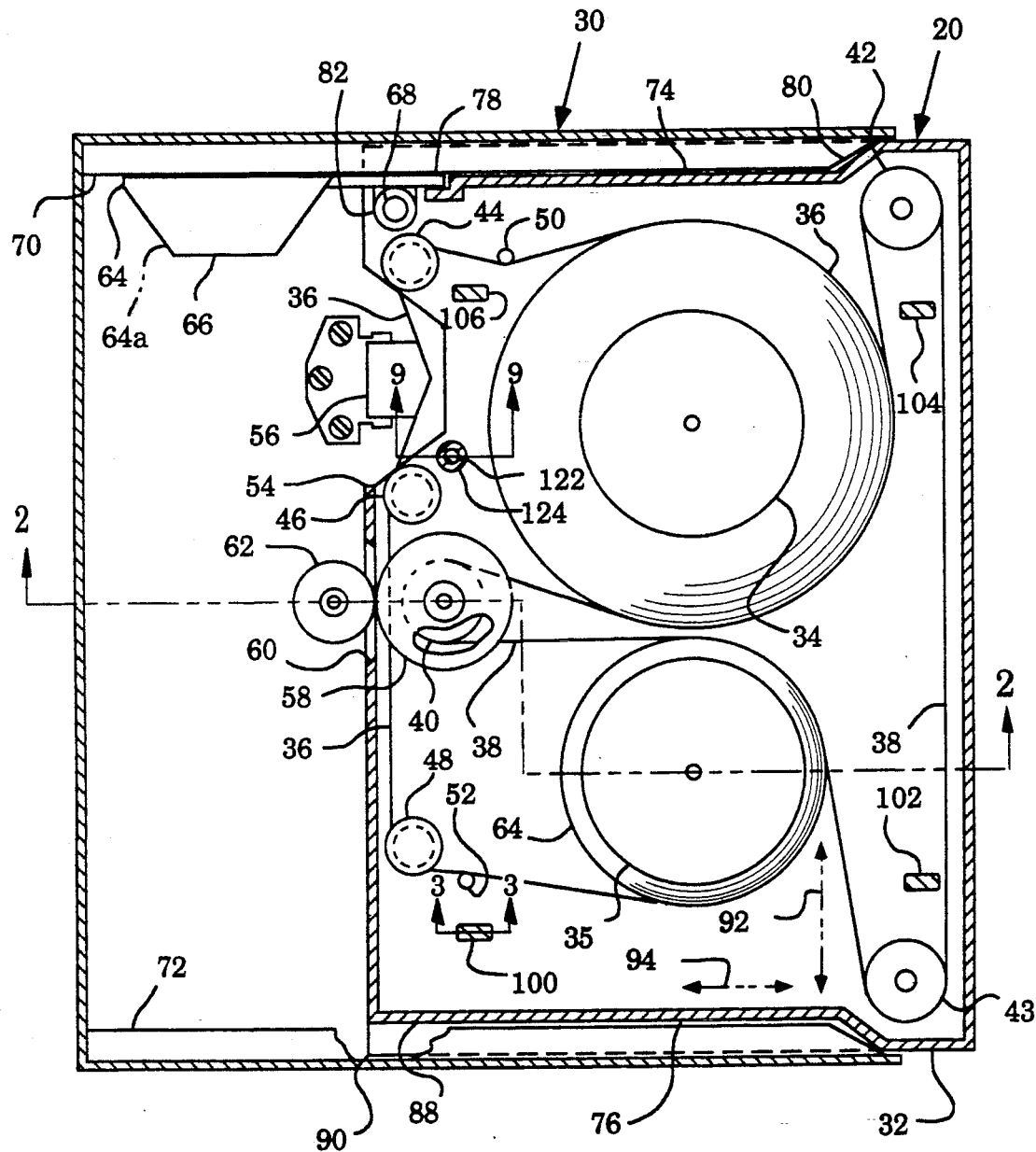
FIG. 1 is a sectional plan view of a tape cartridge employing fasteners in accordance with an embodiment of the present invention.

FIG. 1 is a sectional plan view of a tape cartridge 20, employing fasteners in accordance with an embodiment of the present invention, in a support deck 30. The tape cartridge 20 has a shell 32 in which a pair of tape reels 34, 35 are mounted with a magnetic tape 36 convolutely wound thereon. A resilient belt 38 closely contacts a sector of the tape 36 wound about each tape reel 34, 35. The belt 38 also is led around a belt drive roller 40 and a pair of belt guide rollers 42, 43. Thus the belt 38 can respond to the belt drive roller 40 and cause the tape reels 34, 35 to rotate by means of friction between the belt 38 and the magnetic tape 36.

Between the tape reels 34, 35 the magnetic tape 36 passes around three tape guides 44, 46 and 48. Between the tape reel 34 and the tape guide 44, the magnetic tape 36 is led around a tape wrap pin 50. The magnetic tape 36 passes around a similar tape wrap pin 52 between the tape reel 35 and the tape guide 48. The tape guides 44, 46 are positioned on either side of an opening 54 in the shell 32 where a transducer head 56, mounted on the support deck 30, contacts the magnetic tape 36.

The belt drive roller 40 has a rim portion 58 which contacts, through an aperture 60 in the shell 32, a drive roller 62 which extends up from the support deck 30. Thus the drive roller 62, through the belt drive roller 40 and its rim 58, can drive the belt 38 in either direction causing the magnetic tape 36 to pass over the transducer head 56 as it is exchanged between the tape reels 34, 35. Because the rim 58 extends over the belt drive roller 40 to contact the drive roller 62, the tape 36 may pass underneath between the tape guides 46, 48.

A door 64, having a flange 66 corresponding to the opening 54, is pivotally mounted on a pivot stud 68 and covers the opening 54 except when the tape cartridge 20 is inserted into the support deck 30. In that insertion, cartridge guides 70, 72 in the support deck 30 slide into recesses 74, 76 in the shell 32 and a tab 78 on the door 64 is pushed aside by the bevel 80 on the guide 70. The door 64 thus swings to the open position 64a shown in FIG. 1 making the magnetic tape 36 available for contact with the transducer head 56 through the opening 54. The door 64 is urged by a spring 82 to close over the opening 54 upon removal of the tape cartridge 20 from the support deck 30.

Figure 2:
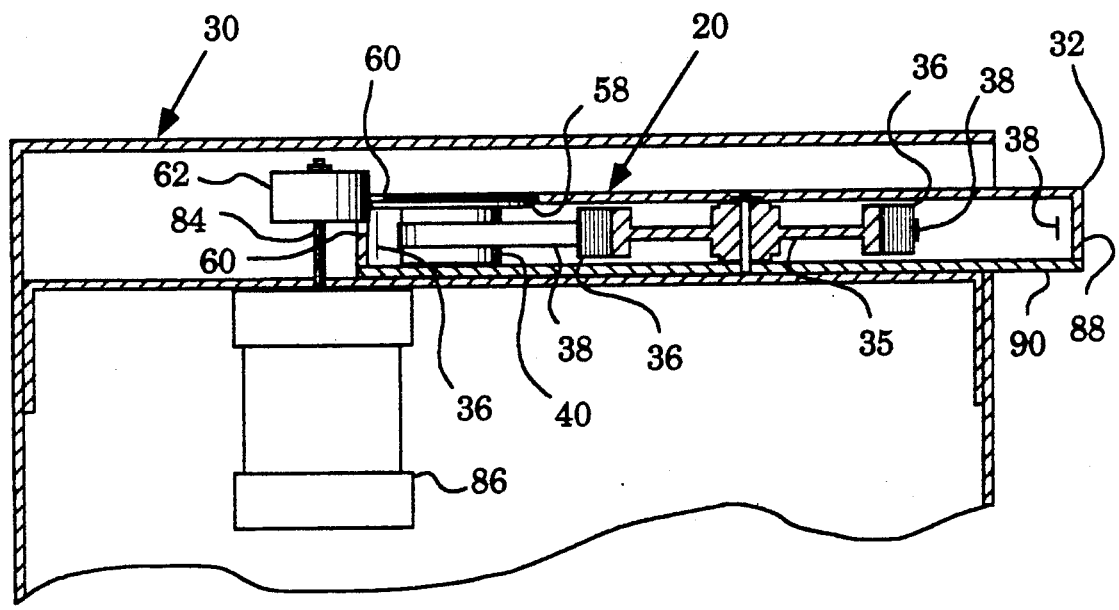
FIG. 2 is a view along the line 2—2 of FIG. 1.

FIG. 2 is a view along the line 2—2 of FIG. 1 illustrating the tape cartridge 20 in the support deck 30. The drive roller 62 extends upward on a drive shaft 84 from a reversible motor 86 and contacts the rim 58 of the belt drive roller 40 through the aperture 60 in the shell 32. The belt 38 is seen to contact the belt drive roller 40 and the magnetic tape 36 convolutely wound on the tape reel 35. The magnetic tape 36 is also shown passing under the rim 58 of the belt drive roller 40.

In FIG. 2 the shell 32 is shown comprised of two parts; a polymeric cover 88 mounted on a flat, rectangular aluminum base plate 90. For clarity of illustration, the cover 88 is shown in section in FIG. 1 over the flat, rectangular base plate 90. The belt drive roller 40 and the belt guide rollers 42, 43 shown in FIGS. 1 and 2 are rotatably mounted on axles which are fixed in the base plate 90. The belt drive roller 40 and the belt guide rollers 42, 43 are preferably crowned to keep the belt 38 positioned thereon.

The cover 88 and base plate 90 shown in FIGS. 1, 2 must be integrated, to form the shell 32, with careful attention to thermal expansion. The fasteners between the cover 88 and the base plate 90 must be able to accommodate the difference in thermal expansion between the polymeric cover 88 and the aluminum base plate 90. If the fasteners effect a rigid connection, the thermal expansion differential may induce forces that result in bowing of the base plate 90. This, in turn, may cause misregistration between the transducer head 56 and the magnetic tape 36.

Since the magnetic tape 36 may have as many as 32 longitudinal tracks it can be appreciated that even a slight bowing of the base plate 90 can compromise the data on the magnetic tape 36. The bowing induced in the base plate 90 due to a rigid connection between the cover 88 and the base plate 90 may occur in both the longitudinal direction 92 (see FIG. 1) of the base plate 90 and the transverse direction 94 (see FIG. 1) but will be more pronounced in the greater length of the longitudinal direction 92. Misregistration between the transducer head 56 and the magnetic tape 36 is also more sensitive to bowing in the longitudinal direction 92.

Figure 3:
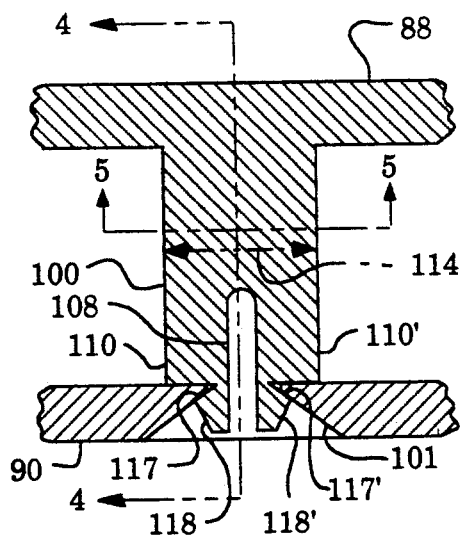
FIG. 3 is a view along the line 3—3 of FIG. 1.

FIG. 3 is a view along the line 3—3 of FIG. 1 illustrating a fastener, in accordance with an embodiment of the current invention, for accommodating the differential thermal expansion described above. The embodiment comprises a snap pin 100 that extends from the cover 88 and engages a hole 101 in the base plate 90. It may be seen in FIG. 1 that similar snap pins 102, 104 and 106 are employed in the other corners of the shell 32 for securing the cover 88 to the base plate 90. The snap pin 100 is bifurcated by a slot 108 to form two resilient legs 110, 110'. The legs 110, 110' releasably engage the diverging side walls of the hole 101, as will be further described below, to secure the cover 88 to the base plate 90. Similar legs on the snap pins 102, 104 and 106 engage corresponding holes, similar to hole 101, in the base plate 90.

Figure 4:
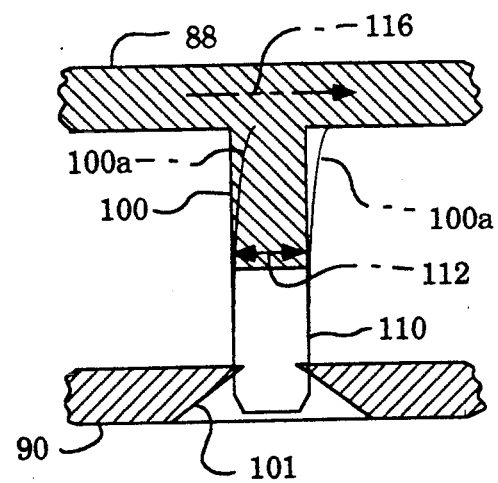
FIG. 4 is a view along the line 4—4 of FIG. 3.

FIG. 4 is a view of the snap pin 100 along the line 4—4 of FIG. 3. In FIGS. 3 and 4 it is noted that the snap pin 100 has a first dimension 112 parallel to the longitudinal direction (92 in FIG. 1) of the base plate 90 and a second dimension 94 parallel to the transverse direction (110 in FIG. 1) of the base plate 90. The first dimension 112 is chosen small enough so that the snap pin 100 flexes in response to a force 116 induced in the cover 88, relative to the base plate 90, by the differential thermal expansion of the cover 88 and the base plate 90. The force 116 is parallel to the longitudinal direction (92 in FIG. 1) of the base plate 90. The flexing response of the snap pin 100 to the force 116 is indicated by the position 100a.

Thus the base plate 90 is relieved from the force 116 and will remain flat along its longitudinal direction (92 in FIG. 1). Consequently, the forces due to differential thermal expansion of the polymeric cover 88 and the aluminum base plate 90 will not cause misregistration between the tape 36 and the transducer head 56.

Figure 5:
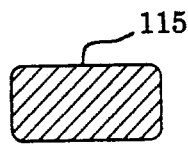
FIG. 5 is a view along the line 5—5 of FIG. 3.

The second dimension 114 of the snap pin 100 is chosen great enough so that the cross section 115, illustrated in FIG. 5 which is a view along the line 5—5 of FIG. 3, provides sufficient strength to secure the cover 88 to the base plate 90 and resist operational forces tending to separate them. The first 112 and second 114 dimensions of the snap pin 100 (and similar dimensions of pins 102, 104 and 106) thus provide for independent dimensional choices to satisfy the dual requirements of (1) flexibility in the base plate 90 longitudinal direction 92 and (2) cross sectional strength. Fasteners that have a symmetrical cross section must compromise in meeting these two requirements.

Figure 6:
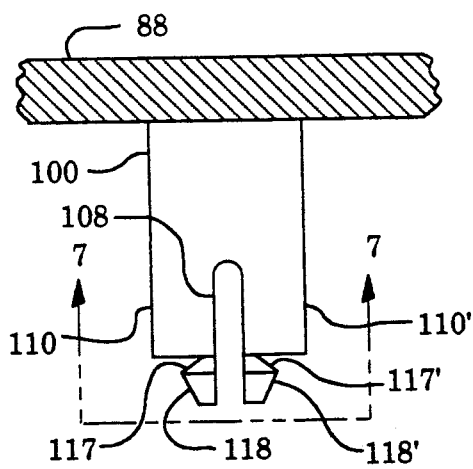
FIG. 6 is a view similar to FIG. 3.
Figure 7:
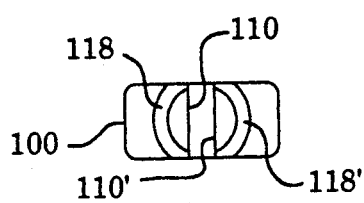
FIG. 7 is a view along the line 7—7 of FIG. 6.

In FIG. 6, which is a view similar to FIG. 3, illustrating the snap pin 100 in full rather than in section, it is easier to see a first bevel 117 and a second bevel 118 defined on the leg 110. The corresponding bevels on the leg 110' are 117', 118'. The second bevel 118, 118' is further illustrated in FIG. 7 which is a view along the line 7—7 of FIG. 6. It may be appreciated from FIG. 3 that the second bevel 118, 118' helps to ease the snap pin 100 into the hole 101 while the first bevel 117, 117' engages the diverging walls of the hole 101 to provide a hold down force to secure the cover 88 to the base plate 90. The resilient legs 110, 110' urge the first bevel 117, 117' of each leg against the diverging walls of the hole 101. The resilient legs 110, 110' may be compressed so as to release the first bevel 117, 117' of each leg from the hole 101 which is necessary for releasing the cover 88 from the base plate 90.

Figure 8:
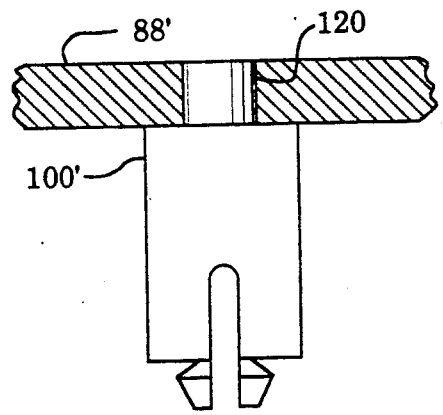
FIG. 8 is a view similar to FIG. 6.

The snap pins 100, 102, 104 and 106 have been illustrated as part of the polymeric cover 88 but they may, also, be fabricated separately from a polymeric material and secured to the cover 88 by adhesive or welding as shown in accordance with this embodiment, in FIG. 8 which is a view similar to FIG. 6, illustrating a snap pin 100' having a round stud 120 fixed in a cover 88'.

Figure 9:
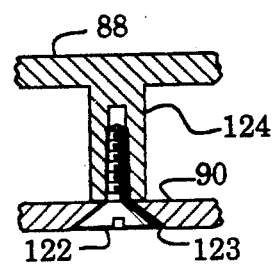
FIG. 9 is a view along the line 9—9 of FIG. 1.

Each of the snap pins 100, 102, 104 and 106 may be released from their corresponding hole as described above to release the cover 88 from the base plate 90. To insure that the cover 88 is not inadvertently removed, a screw 122 is secured through a hole 123 of the base plate 90 into a boss 124 of the cover 88 as illustrated in FIG. 9 which is a view along the line 9—9 of FIG. 1. Since the screw 122 rigidly connects the cover 88 to the base plate 90 at only one point it can not induce differential thermal expansion force into the base plate 90.

Thus a tape cartridge 20 has been provided which has snap pins 100, 102, 104 and 106 that will flex in response to longitudinal forces caused by differential thermal expansion in the cover 88 and base plate 90, of the cartridge shell 32. By so flexing, the pins 100, 102, 104 and 106 relieve the base plate 90 of these forces allowing the base plate 90 to remain flat and retain registration between the magnetic tape 36 and the transducer head 56. At the same time the cross section 115 of the pins 100, 102, 104 and 106 may be independently set to resist operational forces placed upon the cover 88 and the base plate 90.

Although the present invention has been described with reference to preferred embodiments, numerous modifications and rearrangements can be made with the equivalent result still embraced within the scope of the invention.

What is claimed is:

1. A tape cartridge, comprising:
   a base plate;
   a cover; and
   one or more fasteners for securing said cover to said base plate in spaced parallel relationship and for permitting therebetween differential expansion in a first direction extending parallel to said base plate, each of said fasteners comprising an elongated pin connected at a first end to said cover and at a second end to said base plate, said pin having a smaller cross sectional dimension in a first direction than in a second direction extending perpendicular to said first direction to provide greater flexibility in said first direction to avoid bowing said cover and/or base plate when subjected to differential expansion; and
   a slot extending through said pin in said first direction to define first and second spaced legs.

2. A tape cartridge as defined in claim 1 wherein:
   said base plate defines one or more holes; and wherein
   said pin spaced legs are capable of limited resilient movement relative to one another for resilient engagement in one of said holes.

3. A tape cartridge as defined in claim 2 wherein:
   said holes have diverging walls; and
   each of said legs has oppositely directed first and second bevels for facilitating movement of said legs into said holes.

4. A tape cartridge as defined in claim 1 further comprising:
   a pair of reel hubs rotatably mounted on said base plate for bidirectional convolute winding of a magnetic tape therebetween;
   means for rotating said reel hubs; and
   guide means mounted on said base plate for guiding the magnetic tape between said reel hubs.

5. In combination with a cover and a base plate, one or more fasteners for securing said cover to said base plate in spaced parallel relationship and for permitting therebetween differential expansion in a first direction extending parallel to said base plate, each of said fasteners comprising:
   an elongated pin connected at a first end to said cover and at a second end to said base plate, said pin having a smaller cross sectional dimension in a first direction than in a second direction extending perpendicular to said first direction to provide greater flexibility in said first direction to avoid bowing said cover and/or base plate when subjected to differential expansion; and
   a slot extending through said pin in said first direction to define first and second spaced legs.

6. A combination as defined in claim 5 wherein:
   said base plate defines one or more holes; and wherein
   said pin spaced legs are capable of limited resilient movement relative to one another for resilient engagement in one of said holes.

7. A combination as defined in claim 6 wherein:
   each of said holes has a sloped wall and wherein
   each of said legs has a first bevel and a second bevel, said first bevel easing said leg into one of said holes and said second bevel engaging the wall thereof.

8. A method of securing a cover to a base plate in spaced parallel relationship thereto while allowing for differential expansion therebetween without bowing said cover or base plate, said method comprising:
   providing a pin elongated between first and second ends, and having a smaller cross sectional dimension extending in a first direction than in a second direction extending perpendicular to said first direction;
   securing said pin first end to said cover with said pin elongation oriented perpendicular to said cover;
   forming a slot in said pin extending from said second end toward said first end and extending through said pin in said first direction to define first and second spaced legs capable of limited resilient movement relative to one another;
   providing a hole in said base plate;
   installing said pin second end in said hole by first compressing said spaced legs toward one another to permit insertion of said legs into said hole, and then releasing said legs to permit them to resiliently part and engage the wall of said hole.

9. The method of claim 8 including the further steps of:
   undercutting said hole to form a diverging bevel wall; and
   forming a protuberance on said spaced legs having a bevel surface for resiliently engaging said bevel wall.

* * * * *